Aug. 2, 1960

P. BERGER 2,947,909

APPARATUS FOR IGNITING AND OPERATING
GASEOUS DISCHARGE DEVICES

Filed Oct. 30, 1957

Inventor
Paul Berger
By Silverman, Mullin + Cass
attorneys

Inventor
Paul Berger
By Silverman, Mullin & Coss
Attorneys

Aug. 2, 1960

P. BERGER

2,947,909

APPARATUS FOR IGNITING AND OPERATING
GASEOUS DISCHARGE DEVICES

Filed Oct. 30, 1957

Inventor
Paul Berger
By Silverman, Mullin + Corr
Attorneys

United States Patent Office 2,947,909
Patented Aug. 2, 1960

2,947,909

APPARATUS FOR IGNITING AND OPERATING GASEOUS DISCHARGE DEVICES

Paul Berger, Chicago, Ill., assignor to Advance Transformer Co., Chicago, Ill., a corporation of Illinois Filed Oct. 30, 1957, Ser. No. 693,440

29 Claims. (Cl. 315—100)

This invention relates generally to apparatus for use in the ignition and operation of one or more gaseous discharge devices and particularly is concerned with circuits, ballast structures and systems energized from relatively low voltage A.C. lines which provide the high ignition voltages and lower operating voltages for such discharge device or devices.

As well-known, gaseous discharge devices, such as for example, fluorescent lamps or any other discharge device in which an ionizable atmosphere is maintained, ignite at voltages which are substantially higher than their operating voltages, and thus require an appreciable amount of self-regulation in the apparatus used for igniting and operating the same. In addition, such apparatus must provide the necessary ballasting to prevent the gaseous discharge devices from destroying themselves because of their inherent negative resistance characteristics. The usual apparatus includes a transformer into which high leakage reactance is deliberately built so that upon open circuit the desired voltage is available for ignition, but as soon as current commences to flow the leakage flux may either drop the voltage and provides reactance to limit the amount of current flowing through the gaseous discharge devices to that for which they are designed, or combine with capacitive reactance to regulate the current.

This invention is concerned, among other things, with a novel construction of transformer utilizing a central winding leg preferably having at least one bridged air gap in the vicinity of a secondary winding of the transformer, the purpose of which is to prevent distortion of wave shape and the saturation of the core usually occurring in the iron in the vicinity of a coil having a leading current flowing therein. Such a core is utilized in the construction of a transformer herein having an unusual and extraordinary arrangement of windings. The said transformer, although primarily intended for use in apparatus for the ignition and operation of a single relatively high voltage gaseous discharge lamp, specifically a 96 inch or 72 inch T-12 fluorescent lamp intended to carry about .425 ampere operating current, has advantages which are applicable and of great value in the construction of apparatus for the ignition and operation of other gaseous discharge devices in multiple lamp circuits of various kinds, including sequence-start circuits, so-called rapid-start circuits, and variations thereof.

Thus, one of the principal objects of the invention is to provide a new and highly economical apparatus and system for igniting and operating at least one gaseous discharge device from a relatively low voltage source of A.C. which will also provide great efficiency because of good wave shape and low saturation of the core.

Another object of the invention is to provide a novel and economical structure for igniting and operating gaseous discharge devices of the character described in which a higher than line voltage is obtained from the primary winding through the use of an unusual winding arrangement, and in which the resulting current wave is not appreciably distorted.

An important object of the invention is to provide apparatus of the character described in which a novel arrangement of windings results in the production of a high secondary voltage whereby to materially aid in igniting and operating the gaseous discharge device or devices connected in circuit with said secondary winding and wherein the secondary voltage is achieved by substantially less turns than heretofore deemed necessary.

A further important object of the invention is the provision of apparatus which includes a novel transformer structure having a primary divided into two parts which are in open circuit voltage opposition one to the other and are arranged on opposite sides of a secondary winding which is connected in auto-transformer relation with at least one of the parts of the primary winding, but wherein the voltage induced in the secondary winding and available at the output terminals of the circuit is substantially greater than it would be under circumstances where the primary parts were connected in voltage additive relationship.

In connection with the object set forth immediately above, another object is the provision of a novel transformer structure which gives rise to the unusual and extraordinary phenomenon described, having one part of the primary winding separated from the secondary winding by means which provides sufficient coupling to enable said primary part to inductively affect the circuit, but which produces flux of such a nature as to cause increased voltages to be produced in the other portion of the primary winding and to be induced in the secondary winding.

Another object of the invention is concerned with the provision of a structure of the character described in which substantially scrapless laminations of great economy can be used to achieve unusual and outstanding results without the need for a magnetic shunt between one primary part and the secondary winding.

Still further objects of the invention are the provision of various systems and circuits having the basic structure incorporated therein, said structure comprising a primary winding formed of two parts having substantially different coupling relative to a secondary winding which is connected in auto-transformer relationship with all of the primary winding or a part thereof.

Another object of the invention is to provide a structure for igniting and operating gaseous discharge devices in which a primary winding is connected across an A.C. line, and has other inductive windings connected therewith and magnetically related thereto, said primary winding being formed of two parts which are in voltage opposition one to the other, said other inductive windings being in additive open circuit voltage relationship with a part of the said primary winding whereby to provide igniting and operating voltage for said gaseous discharge devices.

Still a further object of the invention is to provide apparatus as described in the object set forth immediately above in which only one of the said parts is connected in auto-transformer circuit with said other inductive windings.

Another object of the invention is to provide a structure of the character described in which there is a primary winding formed of two parts and a secondary winding in auto-transformer relationship relative to the primary winding, the windings being so related inductively and positioned on a core with respect to one another, that the voltage across one part of said primary winding is substantially greater than line voltage and the voltage across the secondary winding is greater than it would be if the primary parts were in voltage additive relationship.

Many other advantages and objects will appear as the description of the invention is set forth hereinafter. In order to demonstrate the broad scope and applicability of the invention, a number of preferred structures, circuits and systems for the ignition and operation of gaseous discharge devices are illustrated in the accompanying drawings, and the text provides detailed explanation thereof. Likewise different forms of the core which may be used to mount the windings of the transformer of the apparatus are also illustrated and explained. Notwithstanding the specific description and illustrations herein, it is emphasized that the structures are only exemplary, since the invention is capable of wide and varied application, its advantages and features being of great value in many circuits and systems not shown herein, but readily derived from the teachings thereof.

An attempt has been made throughout the several figures of the drawings to maintain some uniformity of notation so that the same or equivalent elements or parts may be recognized throughout the illustrations, thereby aiding in a full understanding of the applicability of the invention and the relationships which exist between the different structures and circuits.

This invention is characterized by an unusual transformer construction in which there is provided a primary winding which has two parts in voltage opposition to one another, and at least one secondary winding which is in auto-transformer relationship with at least one of the parts.

The expression "auto-transformer relationship" usually connotes a transformer relationship in which the primary winding is connected into the output circuit along with a secondary winding so that the load is subjected to the voltages of the primary and secondary windings together, the voltages conventionally being additive. Since the relationship actually is merely a matter of connection, it is conceivable that instead of being additive to the voltage across the secondary winding, a portion of the primary winding may be in voltage opposition. It is also conceivable that a relationship which is initially bucking on open circuit could eventually become additive after operation commences. This occurs, for example, in one of the circuits illustrated in U.S. Patent No. 2,558,293.

In this specification, the reference to the expression "auto-transformer relationship" will not be limited to one in which the primary and secondary windings are necessarily in additive relationship. This is a definition which will be carried into the claims as well, and is necessary because the two parts of the primary winding herein are in voltage opposition one to the other, and hence one of these parts will be in voltage opposition to the secondary winding if connected into the operating circuit. In several circuits both of the primary winding parts are connected into the operating circuit and hence the secondary winding will be in auto-transformer relationship with both of said parts, although bucking one and additive to the other. In other circuits, one part of the primary winding which is in voltage opposition to the secondary winding, considering a series loop containing both of these windings, is not connected into the operating circuit and hence only the second part is in auto-transformer relationship with the secondary winding, and it is additive relative thereto.

The invention originally evolved from the urgent need for obtaining a device for use in providing high efficiency ignition and operation for a single gaseous discharge device which had good power factor and hence required the secondary winding to carry a leading current, but in a compact and economical construction. As will be seen hereinafter, it was discovered that the basic form of the invention is as well applicable to a great many circuits of different types, giving to these circuits the advantages and benefits referred to heretofore.

Figure 1:
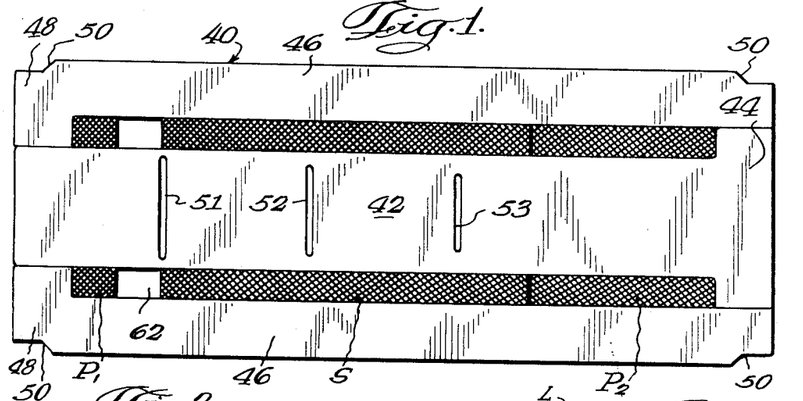
Fig. 1 is a diagrammatic sectional view through a transformer constructed in accordance with the invention, illustrating primarily the formation of the core and the manner of placement of the windings thereon, the core being of the clamped variety.
Figure 2:
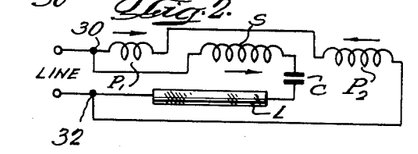
Fig. 2 is a circuit diagram of apparatus for igniting and operating a single gaseous discharge device, the same being a somewhat basic form of the circuit of the invention, suitable for use in connection with the core illustrated in Fig. 1.

Considering first the basic form of the invention, as illustrated in Figs. 1 and 2, this apparatus was intended especially for the ignition and operation of a single relatively high voltage gaseous discharge device from a low voltage A.C. source. The circuit comprises a gaseous discharge device L in series with a condenser C which causes the series secondary winding S to have a leading current flowing therethrough. The secondary winding S is connected between the condenser C and one terminal 30 of the primary winding which, as seen, is formed of two parts $P_1$ and $P_2$ connected in series. The opposite terminal 32 of the primary winding $P_1$—$P_2$ is connected to the left hand terminal of the gaseous discharge device L. A conventional low voltage A.C. line is connected across the terminals 30 and 32 of the primary winding $P_1$—$P_2$ and hence it will be seen that the primary winding including both parts and the secondary winding S are in auto-transformer relationship insofar as the load is concerned. The load in this case can be considered as the gaseous discharge device L although the condenser C may be technically included if one speaks of the load of the transformer per se.

The voltage which is available at the terminals of the gaseous discharge device on open circuit comprises the vectorial sum of the voltages across the windings $P_1$, $P_2$ and S. Substantially the same vectorial sum is effectual to maintain the discharge device in operation except that when current flows through the lamp, the vectorial sum of the voltages across the discharge device L and the condenser C must be equal to the vectorial sum of the voltages of $P_1$, $P_2$ and S. Also the actual values will be different on ignition and operation.

Although all winding of coils is done on the same type of machines, and in the same direction, the open circuit voltage relationship between windings can be controlled by the particular manner of connecting their terminals. Thus, windings can be connected either in voltage opposition or in additive voltage relationship.

The open circuit voltage relationships of the windings of Fig. 2 relative one another are arranged according to the invention as shown by the arrows alongside of the respective windings. Thus it will be seen that while the arrows of the windings S and $P_2$ are additive, the arrow of the winding $P_1$ is in a direction opposite to both of the other arrows and hence this part of the primary winding is in voltage opposition relative the other primary part $P_2$.

One would normally deduce that the total line voltage is not available for ignition and operation of the gaseous discharge device L since the two primary parts $P_1$ and $P_2$ are connected in series with one another, are in direct voltage opposition, and together are connected across the line. Further one would deduce from the information known concerning transformer action, that if the two parts of the primary winding are in opposition, their inductive influence upon the secondary winding will also be bucking and therefore the secondary winding S would not get the benefit of the maximum induced voltage therein.

While the statements above are true for the ordinary transformer, it was found that they are not valid when the structure of the invention herein is used in forming the transformer of the apparatus for igniting and operating one or more gaseous discharge devices.

In Fig. 1 there is illustrated a clamped type of core 40 which has a central T-shaped winding leg 42, the crossbar end 44 of which is engaged between the ends of the L-shaped sides 46. The left hand end of the winding leg 42 is engaged between the short legs 48 of the L-shaped sides 46 and the entire assembly clamped together by means of clamps (not shown) such as for example might engage notches provided therefor at the corners 50. Along the length of the central winding leg 42 there are provided slots 51, 52 and 53 which provide in effect bridged air gaps beneath the secondary winding S.

From an examination of the core of Fig. 1 which is drawn in substantially correct proportions to a practical structure, it may be observed that the secondary winding S is of relatively longer dimension than the other coils. Because of this the flux distribution along the length of the winding S would not be uniform but for the use of the series of gaps or slots 51, 52 and 53. Note that the lengths of these slots decrease along the length of the winding S.

The construction of apparatus having such slots is described and claimed in co-pending application Serial No. 512,034 filed May 31, 1955, and entitled "Electrical Transformer" of which the inventor is Albert E. Feinberg and the assignee the same as the assignee of this application. Full details of the exact nature and operation of the series of slots may be ascertained from an examination of said co-pending application.

The invention herein does not require the series of gaps however, since quite satisfactory results have been achieved only by the use of the slot 51 adjacent the end of the winding S. Where additional economy is sought at the expense of some loss of good wave shape, satisfactory ballasts have been constructed in which the gaps are completely eliminated. Where the winding S is designed to carry leading current, some means for preventing saturation of the core in the vicinity of the secondary winding S is advisable in accordance with the teachings of U.S. Patent No. 2,461,957. This is best applied through the use of at least one slot in the vicinity of the secondary winding S, which in Fig. 1 is not at an end of the core amenable to the formation of a gap between the winding leg and sides or an end yoke.

Figure 27:
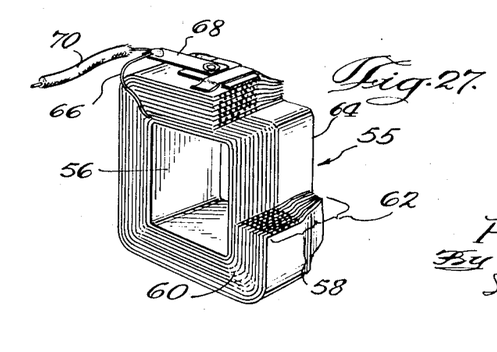
Fig. 27 is a perspective view of a coil with a section broken away to show the details of a portion of a primary winding constructed in accordance with the invention in which the air space of the coil is provided by the coil construction.

The windings S, $P_1$ and $P_2$ are all wound in the conventional manner on suitable forms, such as for example, square cross-section paper tubes, are suitably insulated with paper, tape, and the like, and the leads brought out and soldered to terminals. In the case of the winding $P_1$ a slight change may be made over the usual procedure, and this is illustrated in Fig. 27. A coil 55 is there illustrated suitable for use as the winding $P_1$ in the various circuits and systems referred to herein. The winding is formed on a paper tube 56 which serves as the form. This tube is of an inside diameter which will closely fit the central winding leg 42 to enable the completed coil 55 to be slid onto the winding leg. The winding is formed of a number of turns of wire arranged in layers and designated 58, the layers being alternated with layers of insulating paper 60. Adhesive tape is used to hold several of the layers of the wire turns in place, as for example, the beginning and ending layers, and there are other techniques used. It will be noted from the view that a portion of the length of the entire coil 55 which is designated 62 is devoid of wire. The tube does extend throughout the length of the coil 55, however. Thus, there is a blank space between the edge 64 of the tube 56 and the axial point along the tube where the winding 58 begins. In forming coils for transformers of this type, the usual technique is to form a great many coils along a length of tubing and then to saw the individual windings from the length, pull the terminal ends out as at 66, and to attach them to terminals as at 68 to which the lead wires such as 70 are soldered. In this case, the space 62 is deliberately permitted to remain when the coils are sawed apart.

The windings S and $P_2$ are wound conventionally, and are assembled on the winding leg 42 as shown in Fig. 1 with the primary part $P_2$ on the right hand end followed in order by the secondary winding S and the primary part $P_1$. When the primary part $P_1$ is placed on the winding leg, the blank portion 62 will occupy the space between the turns portion 58 and the end of the secondary winding S and hence such a blank space is designated 62 in Fig. 1. Obviously the winding $P_1$ could be formed conventionally, and an additional plug of non-metallic material inserted at 62.

Returning now to the discussion of the open circuit voltage relationships, it has been found that when assembled in the manner described, that is with the space 62 deliberately formed between the winding $P_1$ and the secondary S, the open circuit voltage induced in the secondary S will be substantially greater than would be normally expected. It may even be greater than it would be if the windings $P_1$ and $P_2$ were additive.

In one of the examples which will be described hereinafter, which is a practical version of the apparatus of Fig. 1, the winding S was composed of 3137 turns, the winding $P_1$ of 190 turns, and the winding $P_2$ of 575 turns. If the two primary parts are considered as a single winding the turn ratio of the secondary winding to the primary winding is about 4.1 to 1. For straight transformation, the maximum voltage which can be expected on open circuit with $P_1$ and $P_2$ additive would be approximately 484 volts. Furthermore, with approximately 25% of the total primary turns connected in bucking voltage relation with the secondary and the remainder of the primary turns, it would not be illogical to expect that the open circuit voltage of the secondary winding would be substantially less—say of the order of 20% less.

It was found upon measuring the voltages in the example, that the open circuit voltage across the secondary winding S was 485 volts, a remarkable phenomenon considering that the two primary parts were bucking, only one of them being additive to the secondary winding while the other was subtractive relative to the secondary winding. The respective open circuit voltages of $P_1$ and $P_2$ were 20.5 and 134. An even more unusual fact was that upon operation the voltage across the secondary winding was 650 volts, notwithstanding the fact that the bucking voltage of the primary part $P_1$ had risen to 29 volts, while the additive voltage of the primary part $P_2$ had risen only to 140 volts.

Connecting the primary winding with the voltages of $P_1$ and $P_2$ additive resulted in a very substantial decrease in the voltage across the secondary winding S, demonstrating that the inclusion of the open space 62 in the transformer structure had completely changed the function thereof in an extraordinary manner.

If the results of applying the construction of the invention to a practical example are compared with the results achieved from the ordinary additive auto-transformer type of structure, obviously there should be a substantial saving in the amount of copper and steel needed to give good igniting and operating characteristics. Practical examples constructed according to the invention actually cost substantially less than the apparatus which has been universally used by all ballast manufacturers for connection with a single gaseous discharge device of relatively high igniting voltage. Such universally used ballasts consisted merely of a single primary and secondary connected in additive auto-transformer relationship, in series with a condenser and usually with a shunt separating the two windings for obtaining the necessary leakage reactance.

This economy has been achieved notwithstanding the additional winding $P_1$ and the additional connections required.

The exact reasons for the phenomenon occurring are not fully understood, but it is believed that the following is a plausible explanation. The reverse primary part $P_1$ causes an increased magnetizing current to flow, since the voltage across the primary part $P_2$ must be more than the line voltage by an amount at least equal to the voltage in the primary part $P_1$. For example, in the structure referred to above, and which will be set forth as a detailed embodiment hereinafter, the line voltage was 118 volts A.C. and the open circuit voltage across the primary part $P_1$ was 20.5 volts. The open circuit voltage across the primary part $P_2$ was 134 volts. During operation, the respective voltages were 29 volts and 140 volts. The difference between the arithmetic sum of the voltages and line voltage is obviously due to the change in relative phase between the windings.

Furthermore, the improvement in wave shape may be attributed to the reverse flux in the vicinity of the slot 51 caused by the winding $P_1$. This tends to keep the total flux density in the vicinity of the secondary winding S substantially below saturation, countering the distorting effects of the bridged ends of the slot 51.

Perhaps another way of looking at the operation of the device is to consider that the winding $P_2$ is closely coupled with the secondary winding S, certainly a great deal closer coupled than is the winding $P_1$, and hence it has a much greater inductive effect upon the winding S than does the primary part $P_1$. Since its voltage is so much greater than the line voltage, the winding S obtains the benefit of being subjected to a source of primary voltage of greater than line value, and hence substantially less turns than expected are needed in the secondary winding S to develop high voltages in that winding.

A ballast was constructed on a core such as the core 40 of Fig. 1 in accordance with the circuit of Fig. 2 with the following specifications:

| | |
|---|---|
| Total core length | 7¾ inches. |
| Core width | 2⅞ inches. |
| Stack height | .800 inch. |
| Width of leg 42 | 1⅛ inch. |
| Width of sides 46 | .564 inch. |
| Width of ends 44, 48 | .564 inch. |
| Slots 51, 52, 53 | All .050 inch wide and from .940 inch to .750 inch long. |

Other physical dimensions generally proportional as in Fig. 1.

Length of winding $P_1$ about .45 inch (overall coil length is 1 inch, with a blank space of about .55 inch).
Length of winding S—about 3.70 inch.
Length of winding $P_2$—about 1.80 inch.

The various windings were composed of the following turns:

$P_1$—190 turns of No. 25 wire.
$P_2$—575 turns of No. 25 wire.
S—3137 turns of No. 28 wire.

The condenser C was 1.45 microfarads with a rating of 700 volts.

With a line voltage of 118 volts A.C. applied across the primary winding $P_1$—$P_2$, for a 96 inch T-12 fluorescent lamp which ignites at approximately 565 volts A.C. and operates at approximately 200 volts A.C. the following voltages were observed:

|  | On open circuit | During operation |
|---|---|---|
| Across $P_1$ | 20.5 | 29 |
| Across $P_2$ | 134 | 140 |
| Across S | 485 | 650 |
| Across all three windings | 590 | 750 |
| Across $P_1$ and S | 460 | 625 |

The condenser voltage was 690 volts. The lamp ignited readily and drew somewhat less than rated current at a voltage of about 198 volts. The primary drew current of the order of .67 ampere at a power factor of about 96 or slightly better, and the wave shape was quite good compared with that of the ordinary ballast for this type of lamp. The ballast was usable as well with a 72 inch T-12 fluorescent lamp whose operating characteristics are not so different from those of the 96 inch lamp as to require complete re-design.

This example is readily varied for gaseous discharge devices of other kinds, and will provide the benefits of the invention. The core can be formed of laminations of the shell type having a center winding leg that is forced into place, or even of reversed L-shaped laminations arranged face to face. Most important, the primary part $P_1$ is required to be so loosely coupled to the secondary winding as to give the results achieved, and it has been found that this is best accomplished by leaving the space between windings blank; also of importance is the requirement that the two primary parts be bucking.

Some study was undertaken in an effort to ascertain the true nature of the unoccupied space such as 62 between the primary part $P_1$ and the secondary winding S. The original omission of an actual magnetic shunt at this point was an attempt to build a structure which could be formed of substantially scrapless laminations, comprising simple T's and L's. Such laminations preferably omit any shunt forming extensions because shunts increase the size of the blank and also increase the resulting scrap from formation of these laminations.

Shunts of different sizes were inserted at the spaces 62 above and below the central winding leg, and it was discovered that while a practical structure might be formed with such shunts, the preferred form, giving the highest voltages for both ignition and operation, is that shown, i.e., leaving the space 62 blank. The particular circuit with which the shunts were associated was that of Fig. 5. The form of core was that of Fig. 6, which will also be explained in some specific detail. The results, however, are applicable as well to substantially all of the embodiments.

The space 62 in the particular example was approximately .6 inch in length in the long direction of the core. The three conditions under which the measurements were made were (1) absence of any shunt, (2) a small shunt of about ¼ inch in length, with a gap of about .025 inch on opposite sides of the winding leg 42, and (3) a shunt of length .400 inch and a very narrow gap of .005 inch. In the first case, the voltages in the primary parts and the secondary winding were the highest, with a slight drop in the second case and a drop of a substantial amount in the third case. The flux distribution throughout the core in the first two cases was not substantially different, but in the third case, the flux dropped considerably, especially in the vicinity of the winding S. Although a slight improvement in the flux density in the vicinity of the primary part $P_1$ was noticeable in case 3 for open circuit, for operation the decrease from the flux density of cases 1 and 2 was quite substantial, being of the order of 13%.

While it is difficult to arrive at conclusions from voltage measurements and flux density measurements of the type made in general tests of this type, the results seem to bear out the theories of operation set forth. The looseness of coupling between the part $P_1$ and the secondary winding S is desirable to cause the flux density in the remainder of the core to be high. As the shunt in space 62 becomes larger and larger, and the gap becomes smaller and smaller, the ultimate condition is that of a complete magnetic short circuit, and the winding $P_1$ becomes a choke with no polarity relationship with the primary winding part $P_2$ and hence the voltage of $P_2$ drops substantially to line voltage and below. The relationship of the primary part $P_2$ and the secondary winding S then become the conventional one of ordinary transformers and hence much lower than achieved through the use of the very loose coupling provided by the space 62.

Figure 3:
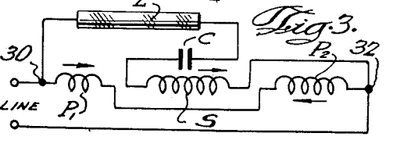
Fig. 3 is a circuit diagram similar to that of Fig. 2 but varying therefrom with respect to the manner of connecting the windings.

The circuit of Fig. 3 is a modified form of Fig. 2 in which the winding S and the gaseous discharge device L are interchanged relative one another. In Fig. 2, the primary part $P_1$ and the secondary winding S are connected together at the terminal 30 of the primary winding $P_1$—$P_2$, while in Fig. 3, the discharge device L is connected to $P_1$ at the terminal 30. The terminal 32 is likewise changed. Both circuits operate identically, with the ignition voltage for the gaseous discharge device comprising the vector sum of the voltages of $P_1$, $P_2$ and S.

Figure 4:
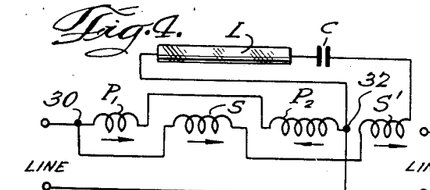
Fig. 4 is a circuit diagram similar to that of Fig. 2 but of a modified form which includes an additional secondary winding closely coupled with the primary winding for certain purposes explained in the text hereinafter.
Figure 5:
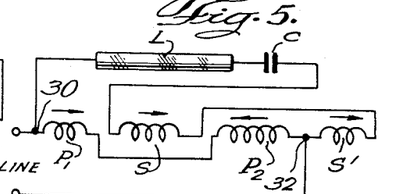
Fig. 5 is a circuit diagram of another form of the invention, being the modified form of Fig. 4 which includes a secondary winding closely coupled with the primary winding, but based upon the circuit of Fig. 3.

In Figs. 4 and 5 there are illustrated two circuits of apparatus which include in addition to the windings $P_1$, $P_2$ and S, an additional winding S' which provides a voltage to augment that of the winding S. This is a variation which is provided by winding additional turns on top of the primary part $P_2$, thereby providing in effect a portion of the secondary which is quite tightly coupled with the primary part $P_2$. The two circuits differ in the placement of the two secondary windings S and S' and the gaseous discharge device L relative the primary parts $P_1$ and $P_2$. In Fig. 4 the terminal 30 is a line connection between the windings $P_1$ and S while the terminal 32 is a line connection between the gaseous discharge device L and the winding $P_2$. In Fig. 5, the terminal 30 is a line connection between the gaseous discharge device L and the primary part $P_1$, while the terminal 32 is a line connection between the primary part $P_2$ and the secondary winding S'.

In both of the circuits of Figs. 4 and 5, the secondary windings S and S' form in effect a single secondary winding which is in auto-transformer relationship with the primary winding $P_1$—$P_2$. As will be seen, the windings $P_2$, S and S' have arrows representing the sense of the instantaneous open circuit voltage, all being additive. $P_1$ is in voltage opposition to the winding $P_2$ as indicated by its arrow.

The variations of the circuits of Figs. 4 and 5 from one another are a matter of design for convenience of connection of components, and arrangement thereof relative to the line leads. The differences do not affect the operation of the apparatus.

Figure 6:
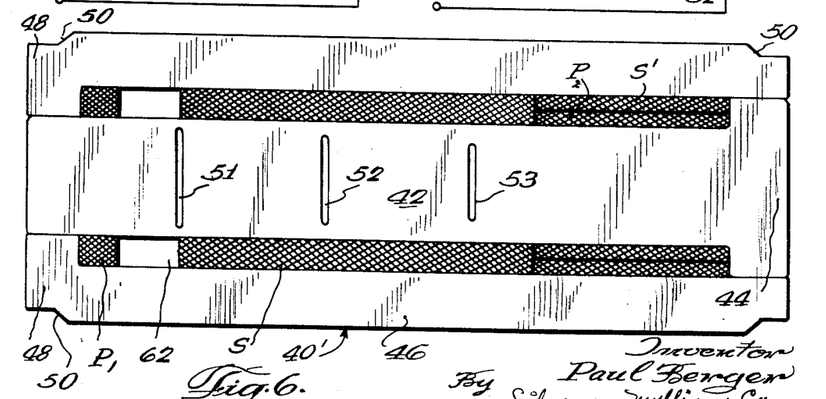
Fig. 6 is a view similar to that of Fig. 1 but illustrating one manner in which the additional secondary windings of Figs. 4 and 5 may be associated with the transformer.

The circuit of Figs. 4 and 5 was associated with the core 40' of Fig. 6 which does not vary substantially from the core 40 of Fig. 1, except in that the windings $P_2$ and S' are shown disposed on the right hand end of the winding leg 42 wound on top of one another.

An example of the invention embodied in a commercial structure according to the circuit of Fig. 5 was constructed having the identical core as that of the example described above in connection with Fig. 1. Several changes were made which gave improved results.

The stack height was .900 inch instead of .800 inch, giving a greater volume of iron for enabling higher flux densities to be handled without sacrificing good wave shape.

The winding constants were as follows:

Length of winding $P_1$ about .375 inch (overall coil form length is 1 inch, with a blank space of about .625 inch).
Length of winding S—about 3.5 inches.
Length of winding $P_2$ combined with S'—about 1.90 inch.
$P_1$—131 turns of No. 23½ wire.
$P_2$—475 turns of No. 23½ wire.
S—2585 turns of No. 27 wire.
S'—270 turns of No. 26 wire wound directly on top of $P_2$.

The condenser C was 1.60 microfarads with a 750 volt rating.

With line voltage at 118 volts A.C. the observed A.C. voltages for a 96 inch T-12 lamp connected into the circuit were:

|  | On open circuit, volts | During operation, volts |
| --- | --- | --- |
| Across $P_1$ | 15.0 | 20.0 |
| Across $P_2$ | 130 | 134 |
| Across S' | 70 | 72 |
| Across $P_2$ and S' | 200 | 205 |
| Across S | 430 | 580 |
| Across all windings | 610 | 765 |
| Across all windings but excluding $P_1$ | 625 | 790 |

There was ample voltage for ignition and operation in this circuit, and good wave shape resulted. The voltage across the condenser was 730 volts. The voltage across all the windings is substantially higher on operation because of the difference in phase between the reactive drops across the condenser C and the lamp L.

The apparatus described utilized the core of Fig. 6 provided with all three of the slots 51, 52 and 53. It was suitable for use with either the 72 inch T-12 lamp or the 96 inch T-12 lamp without any change whatsoever. The current through these lamps was .465 ampere for the longer, and .480 ampere for the shorter, at the respective wattages 70.5 and 56. Respective power factors were 95 and 92.5. The primary current in the case of the longer lamp was .850 ampere, somewhat greater than the .750 ampere drawn when used with the shorter.

The ballast in both cases operated with little noise and favorable heating characteristics. The wave shape was excellent and hence the light output was efficient.

If one studies the list of observed voltages set forth above in connection with the practical example of Fig. 5, in view of the requirements of the gaseous discharge device, the conclusion reached is that the apparatus performs excellently. The ballast is economical, simple to manufacture, uses no complex core structure, and the available voltages are ample both for ignition and operation, with no high current problems. Likewise the type of condenser required is also economical.

But one of the measurements is the key to still another improvement in the apparatus. Note that the voltage across all of the windings is less by approximately the voltage of $P_1$ than the voltage across all of the windings excluding $P_1$. In other words on open circuit the voltage across all the windings is 610 volts while the voltage across all of the windings excluding $P_1$ is greater by 15 volts, namely 625 volts. During operation, this increase amounts to about 25 volts.

This demonstrates that the inductive effect of $P_1$ upon the apparatus is probably its most important effect. Its voltage effect upon the apparatus is either of little or no consequence, and hence could well be dispensed with.

Figure 8:
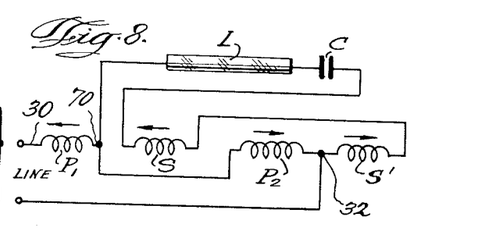
Fig. 8 is a circuit diagram similar to that of Fig. 7, but like the circuit illustrated in Fig. 4, there is an additional secondary winding which is closely coupled with one portion of the primary winding.

Accordingly, the circuit of Fig. 5 was changed to that of Fig. 8 by merely moving the left hand terminal of the gaseous discharge device from the left hand terminal 30 of the winding $P_1$ to the right hand terminal 70 of the primary part $P_1$. This resulted in the secondary windings S and S', the condenser C and the gaseous discharge device L being connected in a series circuit across the primary part $P_2$ only, with all of the windings in the resulting loop being in voltage additive relation.

The practical example of Fig. 5 was not changed one iota for this variation, except for the moving of the lamp terminal. The identical voltages were measured during operation as in the case of the example set forth above, and these were as follows:

|  | Volts |
| --- | --- |
| Across $P_1$ | 22.5 |
| Across $P_2$ | 136 |
| Across S' | 73 |
| Across $P_2$ and S' | 205 |
| Across S | 605 |
| Across S, S' and $P_2$ | 810 |

The condenser voltage was 780 volts, and the current increased to about .480 ampere.

From the data above the picture is now clear that with a circuit which excludes the primary part $P_1$ the ignition voltage is substantially increased, the operating voltage is increased, and the current is also increased. Since there was absolutely no change made except to exclude the primary part $P_1$ from the ignition and operation circuit, it immediately becomes apparent that very substantial savings can be achieved, even over the structures described in connection with Figs. 2 and 5. Since the voltages and current of the example are so much more than needed, it is a simple design matter to decrease the winding turns, decreasing the current and the condenser voltage requirements. These teachings are applicable to all of the circuits described in this specification.

Figure 7:
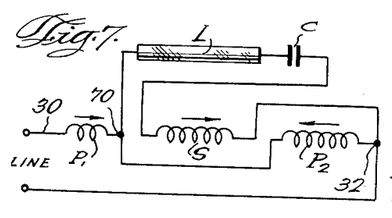
Fig. 7 is a circuit diagram similar to that of Fig. 3 but in this case, only one portion of the primary winding is connected in auto-transformer relationship with the igniting and operating circuit of the gaseous discharge device, for purposes to be described.
Figure 9:
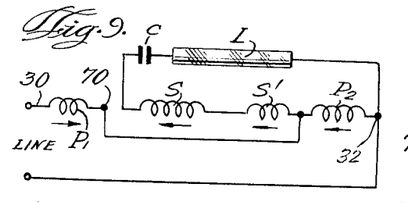
Fig. 9 is a circuit diagram which illustrates a modified form of the circuit of Fig. 5.

Practical circumstances may dictate the advisability of arranging the connections of a ballast so that the winding $P_1$ may be eliminated from the igniting and operating circuits to obtain the maximum voltage for igniting and operating the gaseous discharge devices without the bucking effect of said primary part $P_1$. Figs. 7, 8 and 9 shows such circuits, which correspond generally to Figs. 3, 5 and a modified form of Fig. 5.

In Fig. 7, the left hand terminal 30 of the winding $P_1$ and the right hand terminal 32 of the winding $P_2$ are connected across the line. The secondary winding S, the condenser C, and the discharge device L are all in series and connected only across the primary part $P_2$, from the terminal 32 to the right hand terminal 70 of the primary part $P_1$. Thus, the secondary winding S and the primary part $P_2$ are connected in auto-transformer relationship, omitting the primary part $P_1$. The instantaneous open circuit voltage relationships are as indicated by the arrows with S and $P_2$ additive, while $P_1$ is bucking $P_2$. The inductive effect of $P_1$ will be felt in both the igniting and operating circuits, but its voltage will not contribute directly, either to the ignition or operation of the gaseous discharge device, as explained above in connection with the change made in the circuit of Fig. 5.

In order to obtain the same kind of comparison between the circuit of Fig. 2 and that of Fig. 7, a practical ballast was constructed by merely modifying the practical example of the Fig. 2 circuit described above to conform to the circuit of Fig. 7. This involved only the change of one terminal, the remainder of the apparatus being identical in every respect. Thereafter the operating voltages for the apparatus when used with the same discharge device described above, a 96 inch T-12 fluorescent lamp, were measured. It may be pointed out that the voltage across the secondary S of Fig. 2 alone is substantially greater than the voltage across S combined with $P_1$. When connected as shown in Fig. 7, the following voltages were measured:

|  | On open circuit, volts | During operation, volts |
| --- | --- | --- |
| Across P¹ | 20.5 | 31.0 |
| Across P² | 134 | 140 |
| Across S | 480 | 655 |
| Across all three windings | 610 | 780 |
| Across P¹ and S | 500 | 680 |

The condenser voltage was 770 volts, and there was a slight increase in current. The same conclusions follow as in the case of the modified form of Fig. 5.

The circuit of Fig. 8 of which the voltages are set forth above, may be analyzed in much the same way except that the additional winding S' is present to increase the secondary voltage available for the gaseous discharge device L, and is closely coupled to the primary part $P_2$. It is in series with the secondary winding S and voltage additive relationship with said secondary winding S and the primary part $P_2$.

The circuit of Fig. 9 differs somewhat from the circuit of Fig. 8 in that the gaseous discharge device is connected to the terminal 32 and hence to one side of the line. This is desirable for certain purposes.

Figure 10:
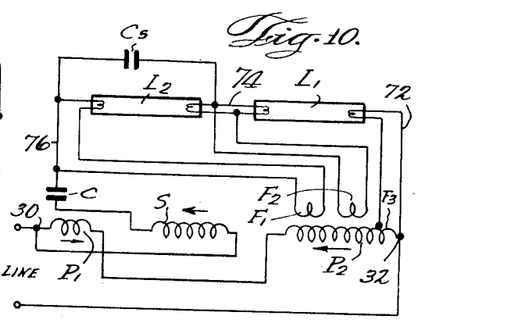
Fig. 10 is a circuit diagram illustrating apparatus for use with rapid-start gaseous discharge lamps, but embodying the invention therein.

Fig. 10 illustrates a circuit in which the invention is embodied in apparatus for the ignition and operation of gaseous discharge devices of the so-called rapid-start type, in which there are filaments which are continuously energized. There is a primary part $P_1$ and a secondary part $P_2$ in series therewith but in voltage opposition, as indicated, the primary parts being connected across the line at their terminals 30 and 32. Gaseous discharge devices $L_1$ and $L_2$ are connected in series with a power factor correcting condenser C and the secondary winding S, the series circuit as described being connected across the terminals 30 and 32. The leads which define this series circuit are 72, 74 and 76. The other electrical leads illustrated in the figure comprise lead means used for energizing the filaments of the gaseous discharge devices. A filament winding $F_1$ energizes the left hand filament of the gaseous discharge device $L_2$, a filament winding $F_2$ energizes the right hand filament of the gaseous discharge device $L_2$ and the left filament of the gaseous discharge device $L_1$, and a filament winding $F_3$ (which may be a few of the end turns of the primary part $L_2$) energizes the right hand filament of the gaseous discharge device $L_1$. All filament windings are closely coupled to the primary part $P_2$ and have current flowing therein at all times. Since the voltage of the primary part $P_2$ is substantially higher than line voltage, less than the usual number of turns of wire are required to obtain the necessary voltage and current from the filament windings.

As in the case of the ordinary rapid-start series sequence start circuit, a starting condenser $C_s$ is in shunt with the discharge device $L_2$. The device $L_1$ starts first, after which flow of current through the condenser $C_s$ provides a voltage across the discharge device $L_2$ starting it. As in the case of Fig. 1, the secondary and both primary parts are in auto-transformer relationship, notwithstanding the fact that the winding $P_1$ is in voltage opposition to the other two. The core with which the circuit of Fig. 8 may be associated is substantially the core of Figs. 1 or 6, except that the filament windings are closely coupled with the primary part $P_2$. In Fig. 6, they would be in substitution of the winding $S_1$.

Rapid-start series-sequence start ballasts advantageously might provide a shunt between the windings $P_2$ and S which would enable the use of cores of the type shown and described in application Serial No. 560,783 filed January 23, 1956, by Bernard Stevens and Reginald D. Christiansen, entitled "Transformer Core Construction" and assigned to the same assignee as that to which this application is assigned. Likewise the usual forced type of core could be used.

Figure 11:
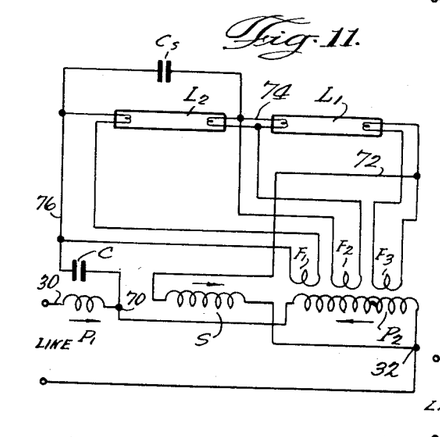
Fig. 11 is a circuit diagram similar to that of Fig. 10 but differing therefrom in that a portion of the primary winding is not included in the igniting and operating circuit.

Fig. 11 differs from Fig. 10 in the respect that the primary part $P_1$ does not contribute voltage directly to the ignition and operation of the gaseous discharge devices. Thus the series circuit described and comprising the two discharge devices $L_1$ and $L_2$ together with the condenser C and the secondary winding S are connected across the terminals 32 and 70. But for the slight change in the filament winding $F_3$, the circuit is like that of Fig. 10 in all other respects.

Figure 12:
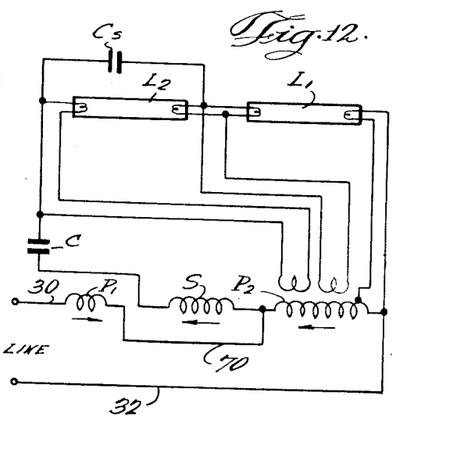
Fig. 12 is a circuit diagram similar to that of Fig. 11 but illustrating a modified form.

Fig. 12 illustrates a variation in the form of the circuit of Fig. 11 in which the secondary winding S is connected to the terminal 70, instead of the terminal 32 as in Fig. 11. Thus, in Fig. 12, the right hand terminal of the discharge device $L_1$ is connected to the terminal 32, and the other changes follow.

Figure 13:
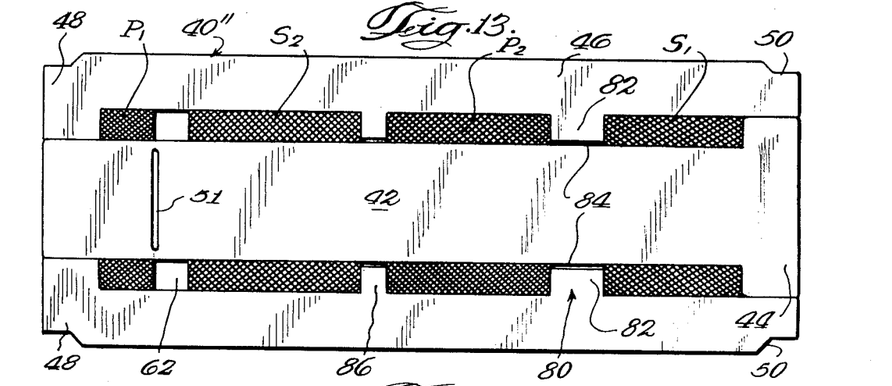
Fig. 13 is a diagrammatic sectional view through a modified form of transformer constructed in accordance with the invention, illustrating the formation of the core and the placement of windings thereon for a sequence-start circuit for gaseous discharge devices, the core being of the clamped variety.
Figure 15:
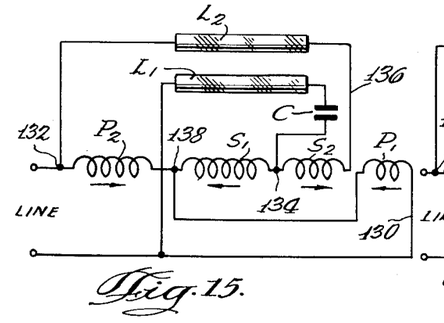
Fig. 15 is a circuit diagram of one form of sequence-start apparatus constructed according to the invention.

The invention is applicable to the series sequence gaseous discharge device circuits which are shown and described in said U.S. Patent 2,558,293. Such circuits embodying the invention are shown in Figs. 15 through 26 inclusive. These circuits require at least an additional secondary winding, and in certain cases a third secondary winding, and hence the cores are constructed somewhat differently from those of Figs. 1 and 6. In Fig. 15, for example, there are the primary parts $P_1$ and $P_2$ and the secondary windings $S_1$ and $S_2$ and in Fig. 19 there is a third secondary winding $S_3$. In Fig. 13 there is illustrated one form of core 40'' which is suitable for use with the apparatus to be described hereinafter. In many respects it is similar to the cores 40 and 40' of Figs. 1 and 6 respectively in that it is formed of a central T-shaped winding leg 42 having a cross bar end 44 clamped between the ends of the L-shaped side members 46 whose short bar ends 48 clamp together the left hand end of the winding leg 42.

The windings $P_1$, $P_2$, $S_1$ and $S_2$ are disposed as shown, with the same space 62 between $P_1$ and $S_2$. As will be seen, during operation the circuit does not differ substantially from an operation circuit in which there is a series secondary winding, two gaseous discharge devices and a condenser all in series and in auto-transformer relationship with a primary winding. In said circuit, the series secondary winding is the winding $S_2$ and this is disposed therefore, between the two primary parts $P_1$ and $P_2$. The winding $S_1$ is a high leakage reactance secondary winding used in igniting the gaseous discharge devices, and it is thus separated from the remainder of the transformer by a shunt 80 formed of extensions 82 provided on the sides 46 and gaps 84. A similar shunt 86 may be provided between the windings $P_2$ and $S_2$, although, as seen in Fig. 14, this may not be essential.

Since the structure as described is capable of operating without the three slots 51, 52 and 53, only one of these is shown in Fig. 13. The winding $S_2$ being not necessarily as long as the winding S in previous structures, the need for flux distribution along the length thereof decreases. The core 40'' is also of the clamped variety and hence would have some means such as the notches 50 to cooperate with clamping devices (not shown).

Figure 14:
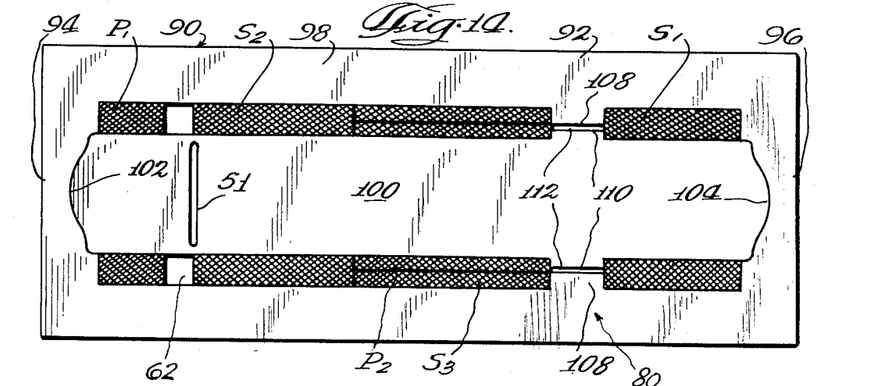
Fig. 14 is a modified form of the core of Fig. 13, especially intended for a somewhat different circuit, the core being of the forced-center type.

Fig. 14 is an illustration of a forced core type of structure 90 having an outer shell 92 with end yokes 94 and 96 and sides 98. The central winding leg 100 has ends which mate with the yokes at 102 and 104 so that an assembled winding leg with its associated windings $P_1$, $S_2$, $P_2$, $S_1$, and an additional winding $S_3$ if included, may be pressed into the shell 92 in tight engagement. The space 62 is again provided between the windings $P_1$ and $S_2$ and a shunt is formed at 80 by providing aligned projections 108 and 110 on the shell 92 and winding leg 100 respectively. A suitable gap is provided at 112. One slot 51 is shown. Note that a shunt equivalent to the shunt 86 has been eliminated.

The circuit shown in Fig. 15 is one in which the voltage across the windings $P_1$ and $S_1$ are applied across the first gaseous discharge device $L_1$ through the condenser C. The right hand terminal 130 of the winding $P_1$ and the left hand terminal 132 of the winding $P_2$ are connected across the line, the two primary parts being in voltage opposition. In the U.S. Patent 2,558,293 above referred to, this particular circuit, in which the primary winding and second secondary winding are in additive open circuit voltage relation, while the first secondary winding is in bucking open circuit voltage relation to the other two windings, the first gaseous discharge device to ignite is in series with a condenser and connected across the first secondary winding alone. In a circuit as described, the first gaseous discharge device to ignite is thus connected with one terminal to the line. This is desirable for several purposes. To connect this device to the line using the circuit of the invention, the primary part $P_1$ may be connected into the circuit with the first secondary winding.

Thus, in Fig. 15, the left hand terminal of the gaseous discharge device $L_1$ is connected to the terminal 130 which leads to the line, the right hand terminal being connected in series with the condenser C and to the junction 134 between the two secondaries $S_1$ and $S_2$. The second to ignite gaseous discharge device $L_2$ is connected across the three windings $P_2$, $S_1$ and $S_2$ from the terminal 132 to the terminal 136 of the right hand end of the second secondary winding $S_2$. When the circuit is energized initially, the voltage across the winding $S_1$ alone, notwithstanding the subtractive effect, if any of the winding $P_1$, is sufficient to ignite the discharge device $L_1$. The flow of current through the discharge device and the winding $S_1$ causes the reversal of phase producing a quadrature component then additive to the voltages of $P_2$ and $S_2$ with the result that the second gaseous device will ignite. The high leakage reactance of the winding $S_1$ forces current to flow in series through the gaseous discharge devices, $L_1$ and $L_2$, the secondary winding $S_2$ (and the condenser C. This effective series circuit is across the primary winding $P_1$—$P_2$ and hence is now in auto-transformer relationship therewith. During ignition, the first secondary winding $S_1$ could be considered as having been in auto-transformer relationship with the primary part $P_1$ although bucking, while the secondary winding $S_2$ was in additive auto-transformer relationship only with the primary part $P_2$.

Figure 16:
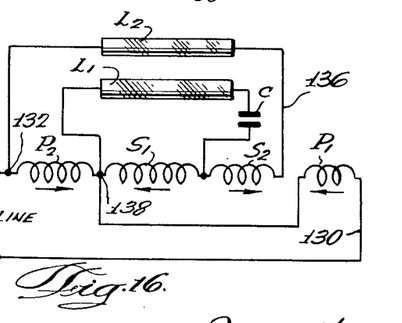
Fig. 16 is a circuit diagram similar to that of Fig. 15, but illustrating a modified form in which only one portion of the primary winding is connected into the igniting and operating circuit.

This same circuit is shown with a modification in Fig. 16. Here the primary part $P_1$ does not contribute directly either to ignition of either of the gaseous discharge devices or to the operation thereof. Instead of being connected to the terminal 130, the left hand end of the gaseous discharge device $L_1$ is connected to the junction 138 between the windings $P_1$ and $P_2$ which is also the point at which the left hand terminal of the first secondary winding $S_1$ is connected. The manner in which the gaseous discharge devices are ignited and operated will be evident from this circuit and a consideration of Fig. 15. The disadvantage of the circuit is that the left hand terminal of the discharge device $L_1$ does not open to the line, but this disadvantage can be overcome in certain cases, as will be seen hereinafter.

The said Patent 2,558,293 also described a variation of the sequence start circuit in which, while the two secondary windings are still in voltage opposition on open circuit, the gaseous discharge devices are connected somewhat differently. The primary winding is in additive open circuit voltage relationship with the first secondary wnding and the first to ignite gaseous discharge device is connected in series with a condenser and together therewith across the primary and first secondary windings. The second to ignite gaseous discharge device is connected across both of the secondaries. The first secondary winding is thus in common with both igniting loops. When the transformer is energized, the first lamp ignites by virtue of the total voltage of the primary and first secondary windings together, after which flow of current causes a reversal of phase in the first secondary winding giving rise to a component of voltage therein which is now additive to the voltage of the second secondary. Thus, after ignition of the first gaseous discharge device there is sufficient voltage across the second gaseous discharge device to ignite the same. The flow of current is principally through the gaseous discharge devices, condenser and the second secondary, since the leakage reactance of the first secondary winding is so great as to impede the flow of current therethrough. During operation, the secondary winding is in additive auto-transformer relationship with the primary winding although bucking during starting.

The invention is applied to the variation of Patent 2,558,293 described above in the circuit of Fig. 17. The primary here is composed of two parts $P_1$ and $P_2$ which are in voltage opposition. The first to ignite discharge device $L_1$ is in series with the condenser C and together therewith connected across the windings $P_2$ and $S_1$, from the terminal 132 to the junction 134. In this respect the connection is similar to that of the said Patent 2,558,293. The second gaseous discharge device $L_2$, however, is connected from the right hand terminal 136 of the winding $S_2$ to the right hand terminal 130 of the primary part $P_1$, and hence it is subject to the voltage of the three windings $P_1$, $S_1$ and $S_2$ on ignition and also during operation. As in the case of Fig. 15, the circuit includes the winding $P_1$ to enable the gaseous discharge device $L_2$ to be connected to a line terminal.

Figure 17:
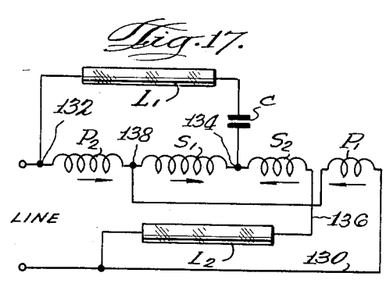
Fig. 17 is a circuit diagram of another form of sequence-start apparatus constructed in accordance with the invention.
Figure 18:
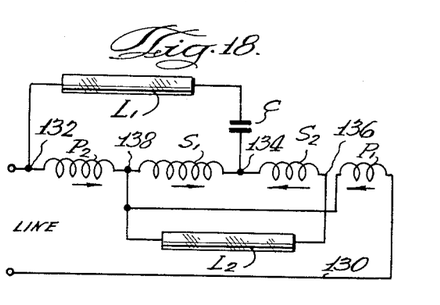
Fig. 18 is a circuit diagram similar to that of Fig. 17 but illustrating a modified form in which only one portion of the primary winding is connected into the igniting and operating circuit.

In Fig. 18 there is illustrated the modified form of the circuit of Fig. 17 in which the primary part $P_1$ is not directly connected to contribute to the voltage of ignition or operation of the circuit. In this case, the left hand terminal of the gaseous discharge device $L_2$ is connected to the junction 138 between windings $P_2$ and $S_1$. The bucking effect of the winding $P_1$ is thus eliminated and higher voltages on ignition and during operation may be realized.

In U.S. Patent No. 2,683,243 there is described an improvement of the apparatus of U.S. Patent No. 2,558,293 in which additional voltage for the ignition and operation of the gaseous discharge devices is achieved by having a portion of the second secondary winding closely coupled with the primary winding. The advantages of this structure are that there is better balance of currents, the additional voltage is achieved through an economical use of copper, and there is no substantial increase in the size of the transformer. Such a ballast is quieter and gives better wave shape. This modification is used in the embodiments of the invention which are shown in Figs. 19, 20, 21 and 22. The differences between these circuits are the same as those between the circuits of Figs. 17, 18, 15 and 16 respectively. The only change is the addition of the secondary winding $S_3$ closely coupled with the primary part $P_2$.

Figure 19:
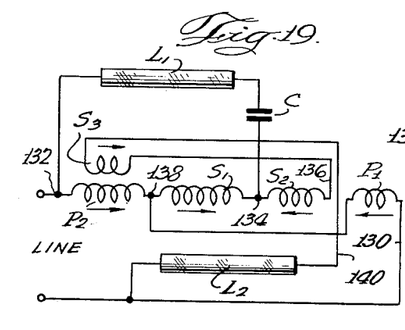
Fig. 19 is a circuit diagram similar to that of Fig. 17, but of a modified form in which there is an additional secondary winding which is closely coupled with a portion of the primary winding.
Figure 20:
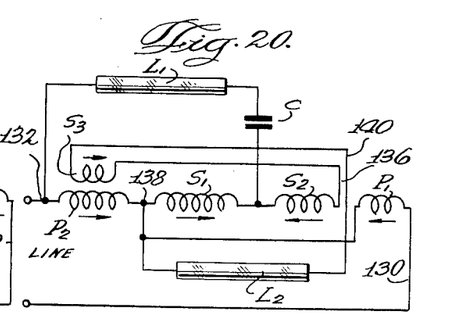
Fig. 20 is a circuit diagram similar to that of Fig. 19 but of a modified form in which only one portion of the primary winding is connected into the igniting and operating circuit.
Figure 21:
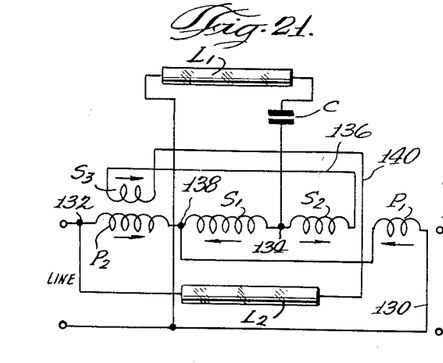
Fig. 21 is a circuit diagram similar to that of Fig. 15, but illustrating a modified form in which there is an additional secondary winding which is closely coupled with part of the primary winding.
Figure 22:
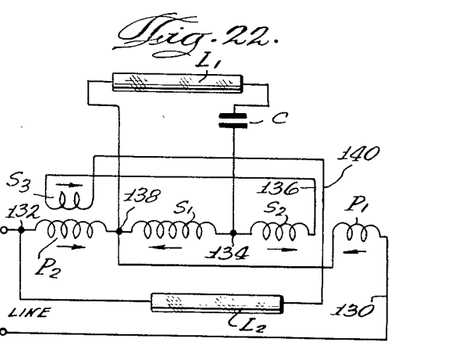
Fig. 22 is a circuit diagram similar to that of Fig. 21 but illustrating a modified form in which only a portion of the primary winding is connected into the igniting and operating circuit.

Looking at Fig. 19 for example, the connection of the gaseous discharge device $L_1$, the condenser C, the primary part $P_2$ and the first secondary winding $S_1$ are the same as in Fig. 17. As in the case of the circuit of Fig. 17, the left hand terminal of the gaseous discharge device $L_2$ is connected to the right hand terminal 130 of the primary part $P_1$. The third secondary winding $S_3$ is interposed between the right hand terminal 136 of the second secondary winding $S_2$ and the right hand terminal of the gaseous discharge device $L_2$ at 140. Winding $S_3$ is in additive open circuit voltage relationship with the winding $S_2$.

The operation of the circuits of Figs. 19, 20, 21 and 22 is similar to the operation of the respective circuits of Figs. 17, 18, 15 and 16, and hence no further explanation thereof is believed necessary.

Figure 23:
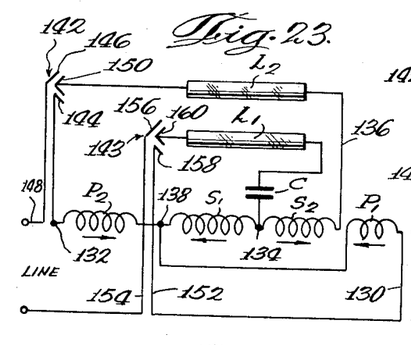
Fig. 23 is a circuit diagram similar to that of Fig. 15, but illustrating a modified form in which shunting sockets are connected into the terminals of the primary winding to open the line with the removal of either gaseous discharge device.

As mentioned previously there are advantages to having gaseous discharge devices terminate at the line terminals, one of which consists of the facility of using the so-called shunting sockets. These sockets include two contacts which are open until bridged by the inserted terminal of the gaseous discharge device, so that removal of the device opens the line into which the socket is connected. In this manner, a requirement of the Underwriters Laboratories is met for lamps of relatively high voltage. In Fig. 23 there is illustrated the circuit of Fig. 15 which has been modified by the addition of the shunting sockets 142 and 143.

The electrical connections and operations of the circuit of Fig. 23 are identical to those of the circuit of Fig. 15 except that the leads to the line are opened for the insertion of the sockets. Thus, instead of extending directly to one side of the line, the left hand terminal 132 of the winding $P_2$ connects to one contact 144 of the socket 142, the other contact 146 of which connects by way of the lead 148 to the line. The left hand terminal 150 of the gaseous discharge device $L_2$ bridges the contacts 144 and 146 when inserted in socket 142 and opens the primary winding $P_1$—$P_2$ when removed. The lead from the terminal 130 to the line is opened providing leads 152 and 154 which extend to the contacts 156 and 158 of the socket 143, the left hand terminal 160 of the discharge device $L_1$ bridging these contacts when in position in socket 143.

Figure 24:
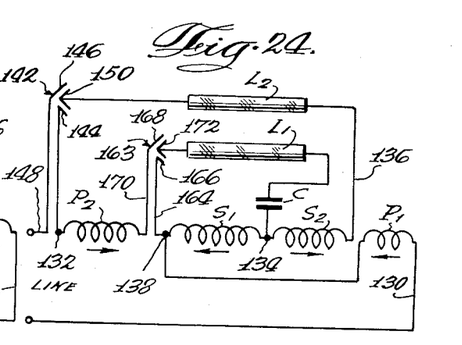
Fig. 24 is a circuit diagram similar to that of Fig. 16 but illustrating a modified form with shunting sockets for enabling opening of the primary winding with the removal of either gaseous discharge device.

Fig. 24 is a modified form of Fig. 16 using shunting sockets. Since the usual commercial ballast is in the form of a canister with electrical wires extending therefrom, it is preferable to have as few leads as possible so as not to confuse the user. In Fig. 23, the connection between the primary winding parts $P_1$ and $P_2$ is on the interior of the canister, and the leads 132 and 152 are brought out of the canister. The leads 148 and 154 are readily connected to the respective sockets. The advantage of eliminating the bucking effect of the primary part $P_1$ is somewhat offset by the circuit of Fig. 24 in that the connection between the primary parts $P_1$ and $P_2$ is open and hence there is at least an additional lead which must be brought out of the canister and connected to exterior components.

In Fig. 24, the junction 138 does not connect directly to the right hand terminal of the primary part $P_2$ but instead extends by lead 164 to the contact 166 of the shunting socket 163. The other contact 168 extends by lead 170 to the right hand terminal of the primary part $P_2$. The left hand terminal 172 of the gaseous discharge device $L_1$ is adapted to bridge the contacts of the shunting socket 163. The operation of the circuit is identical to that of Fig. 16, and the connection of the gaseous discharge device $L_2$ is exactly like that of Fig. 23. Note that it will be necessary to extend the leads 130, 164, 170 and 132 from the canister in addition to the two leads for the right hand terminals of the gaseous discharge devices. This is an increase of two leads over those of Fig. 23.

Figure 25:
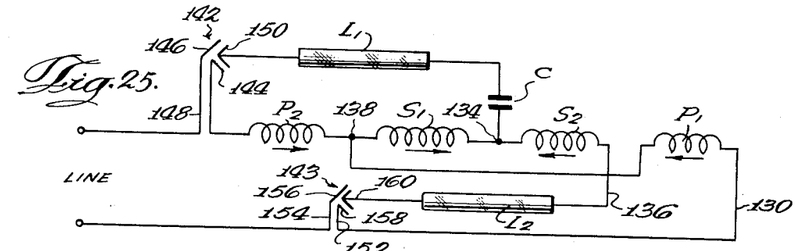
Fig. 25 is a circuit diagram similar to that of Fig. 17 but illustrating a modified form with shunting sockets for enabling opening of the line with the removal of either gaseous discharge device.
Figure 26:
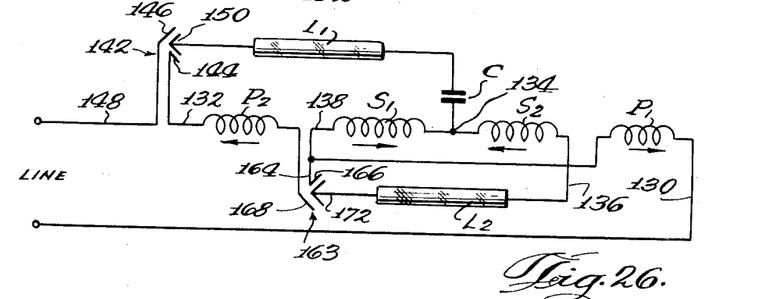
Fig. 26 is a circuit diagram similar to that of Fig. 18 but illustrating a modified form with shunting sockets for enabling opening of the primary winding with the removal of either gaseous discharge device.

Figs. 25 and 26 are circuits which are electrically similar to those of Figs. 17 and 18 respectively, but differ physically in the use of the shunting sockets. These circuits have the shunting sockets 142 and 143 in Fig. 25 both at line terminals, but in Fig. 26 only the shunting socket 142 is at a line terminal. The shunting socket 163 is located between the primary parts $P_1$ and $P_2$ in Fig. 26. It is believed that the circuits need not be explained in detail, since their manner of operation is similar in all respects to circuits already described.

The circuits which are illustrated in Figs. 2, 3, 4, 5, 7, 8, 9, 10, 11 and 12 have the windings positioned therein in the same relative locations that the windings are actually positioned on the cores used therewith and illustrated in Figs. 1 and 6. The circuits which are illustrated in Figs. 15 through 26 inclusive, are not drawn in this manner in order to avoid any confusion. The windings are in every case arranged on the core with the primary part $P_2$ disposed between the two secondary windings $S_1$ and $S_2$, and the primary part $P_1$ is in every case located outside of the second secondary winding $S_2$ being separated by means providing a very loose coupling which preferably is a space 62.

In all of the illustrations the conventional symbols for iron cores has been intentionally omitted, also in the interest of clarity. All of the structures are mounted on iron cores formed of stacks of laminations clamped or riveted together in conventional manners, and where described, as in apparatus whose windings are to be mounted on the cores 40″ and 90 of Figs. 13 and 14, suitable shunts are used. In Figs. 13 and 14 these shunts are shown formed of integral portions of the side members or winding legs, but small separate shunts may be formed of laminated assemblages of the usual silicon steel sheet and inserted in place. Likewise, powdered metal shunts may be used.

All of the ballasts which include the windings and the condensers are potted in steel canisters using any suitable heat-dissipating potting compound such as pitch and silica mixtures. These canisters affect the voltages and characteristics of the apparatus slightly because of their inductive effect upon the magnetic structure, and in utilizing the teachings of this invention these factors, well-known to those skilled in the art, are taken into consideration. In connecting the circuits of the invention, as in all gaseous discharge circuits, small condensers are used to eliminate radio interference, and large ohmage resistors are connected across the large capacitors to prevent accumulation of charge. Neither the radio interference condensers nor the leakage resistors are shown in the illustrations.

It is believed that there is no need to set forth examples of the rapid-start circuits or the sequence-start circuits in addition to those already discussed. The details of the former are well known, and the details of most of the modifications of U.S. Patents 2,558,293 and 2,683,243 are so universally used throughout the world that ballast engineers are almost without exception fully aware of the same. The specifications of the said patents contain specific examples, from the data of which, the invention herein is readily applied thereto to achieve the circuits described in Figs. 16 through 26 inclusive.

What it is desired to claim by Letters Patent of the United States is:

1. Apparatus for igniting and thereafter providing operating voltage for at least one gaseous discharge device from a source of A.C. voltage which comprises, an elongate iron core having a primary winding mounted thereon adapted to be connected across said source and being formed of first and second primary parts, said primary parts being series connected in voltage opposition to one another and physically separated along the length of said core, at least one secondary winding disposed on said core closer coupled with said second primary part than with said first primary part, a condenser, lead means for connecting said condenser in series with said one gaseous discharge device and said one secondary winding, and means connecting said one secondary winding in auto-transformer relationship with at least said second part of said primary winding and with said one secondary winding and said second primary part being in additive voltage relationship during operation.

2. Apparatus for igniting and thereafter providing operating voltage for at least one gaseous discharge device from a source of A.C. voltage which comprises, an elongate iron core providing a magnetic circuit, a primary winding formed of first and second parts, a secondary winding, a condenser, lead means for connecting said condenser in series with said secondary winding and said one gaseous discharge device, and lead means for connecting said secondary in auto-transformer relationship with at least the second of said primary parts, said primary parts being magnetically coupled with said secondary part and being connected with the open circuit magneto-motive force induced in the said magnetic circuit by said second primary part reenforcing and closely coupled with that induced by said secondary winding but being in opposition to that induced by said first primary part, and means providing a substantially looser coupling between the magneto-motive force of said first primary part and the magneto-motive force of said secondary winding.

3. Apparatus as claimed in claim 2 in which said last mentioned means comprises a high leakage magnetic shunt disposed between said first primary part and secondary winding, and the said secondary winding is disposed between the primary parts.

4. Apparatus as claimed in claim 1 in which the said one secondary winding is located between said primary parts on said core.

5. Apparatus as claimed in claim 1 in which the said one secondary winding is located between said primary parts on said core, and there are means between said one secondary winding and said first primary part providing a substantially high magnetic leakage.

6. Apparatus as claimed in claim 1 in which the said one secondary winding is located between said primary parts on said core, and there is a substantial non-magnetic space between said secondary winding and said first primary part.

7. Apparatus as claimed in claim 1 in which said one secondary winding is formed of first and second series connected parts in additive open circuit voltage relationship, the first secondary part being substantially closer coupled with the second primary part than is said second secondary part.

8. Apparatus as claimed in claim 1 in which said one secondary winding is formed of first and second series connected parts in open circuit additive voltage relationship, the first secondary part having a substantially lesser number of turns than said second secondary part and being closer coupled with said second primary part than is said second secondary part.

9. Apparatus for igniting and thereafter providing operating voltage for at least one gaseous discharge device from a source of A.C. voltage which comprises, a primary winding formed of first and second primary parts series connected in voltage opposition and spaced from one another on said core, a secondary winding disposed on said core, a condenser adapted to be connected in series with said secondary winding and gaseous discharge device, and means for connecting said secondary winding in auto-transformer relationship with at least said primary part and in additive operating voltage relationship therewith, said secondary winding being coupled much closer to said second primary part than to said first primary part and being disposed on said core with one physical end thereof spaced from a physical end of said first primary part, and at least one bridged gap in said core at the said one physical end of said secondary winding.

10. Apparatus as claimed in claim 9 in which one physical end of said second primary part is disposed upon said core in substantially abutting relationship with the second physical end of said secondary winding.

11. Apparatus for igniting and thereafter providing operating voltage for a gaseous discharge device from a source of A.C. voltage which comprises, an elongate iron core, a primary winding formed of a first primary part in series with a second primary part with the parts in voltage bucking relationship and disposed in physical spaced relation along the length of the said core, a secondary winding arranged on said core substantially closer coupled to said second primary part than said first primary part, a condenser, means for connecting said primary winding across said source, and means for connecting all of the windings, condenser and gaseous discharge device in a series loop whereby the said secondary winding is in auto-transformer relationship with said primary winding in open circuit voltage opposition with said first primary part, and in additive open circuit voltage relationship with said second primary part.

12. Apparatus for igniting and thereafter providing operating voltage for at least one gaseous discharge device from a source of A.C. voltage which comprises, an elongate iron core having a primary winding mounted thereon adapted to be connected across said source and being formed of first and second primary parts, said primary parts being series connected in voltage opposition to one another and physically separated along the length of said core, at least one secondary winding disposed on said core closer coupled with said second primary part than with said first primary part, a condenser, lead means for connecting said condenser in series with said one gaseous discharge device and said one secondary winding, and means connecting said one secondary winding in auto-transformer relationship with at least said second part of said primary winding, and said second part and one secondary winding being in additive voltage relationship both on open circuit and during operation.

13. Apparatus for igniting and thereafter providing operating voltage for at least one gaseous discharge device from a source of A.C. voltage which comprises, an elongate iron core, a primary winding formed of a first primary part in series with a second primary part with the parts in voltage bucking relationship and disposed physically spaced from one another along the length of the core, a secondary winding arranged on said core substantially closer coupled to said second primary part than to said first primary part, means for connecting said primary winding across said source, and means for connecting said secondary winding, said one gaseous discharge device, and second primary part only in a substantially series circuit in which the said secondary winding is in auto-transformer relationship with said second primary part only.

14. Apparatus as claimed in claim 13 in which the auto-transformer relationship is additive during operation of said gaseous discharge device.

15. Apparatus as claimed in claim 13 in which the auto-transformer relationship is additive both on open circuit and during operation of said gaseous discharge device.

16. Apparatus as claimed in claim 13 in which the secondary winding is also formed of two parts and one secondary part is substantially closer coupled with said second primary part than is the second secondary part.

17. Apparatus as claimed in claim 13 in which a portion of said secondary winding is in the form of a coil coaxial with the second part of the said primary winding.

18. Apparatus for igniting and operating a single gaseous discharge device from a source of A.C. voltage which comprises, an elongate iron core transformer core, a primary winding connected across the source and being formed of two series bucking parts, each part being a physically separate coil and the coils being spaced from one another along the length of the core, a secondary winding connected in auto-transformer relation with said primary winding and formed as an elongate coil positioned on the core between the primary parts but with the second primary part closer coupled thereto than said first primary part, and the secondary and second primary part being in additive voltage relationship, means including a reactance for connecting the gaseous discharge device to be subjected to the voltage of said secondary winding and primary winding as an auto-transformer load.

19. Apparatus as claimed in claim 18 in which the secondary winding has a series connected portion thereof formed as another coil disposed in the same position on said core as said second primary part.

20. Apparatus for igniting and operating a single gaseous discharge device from a source of A.C. voltage which comprises, an elongate iron core transformer core, a primary winding connected across said source and formed of two series connected bucking parts, each part being a physically separate coil, a secondary winding arranged on said core with the first primary part coil in substantially looser coupling relationship with said secondary winding than said second primary part coil, means including a capacitive reactor for connecting said gaseous discharge device in additive auto-transformer relation only with said second primary part.

21. Apparatus as claimed in claim 20 in which the secondary winding is formed of two physically separate coils and one is much closer coupled with said second primary part than the other.

22. Apparatus for igniting and thereafter providing operating voltage for a pair of gaseous discharge devices adapted to be ignited seriatim and thereafter operated as substantially a series-connected circuit, and including a low voltage A.C. source, a pair of gaseous discharge devices, a primary winding connected across the said source and being formed of two series connected parts arranged in open circuit bucking voltage relationship, an elongate iron core and the parts being spaced from one another along the core, a secondary winding disposed upon the core in relatively close coupled relationship with the second primary part and the core having means providing a relatively loose coupling between the first primary part and the said secondary winding, one of said gaseous discharge devices being connected in open circuit auto-transformer relationship with said secondary winding and at least the second of said primary parts with the said secondary winding and second primary part in additive voltage relationship therein, whereby the combined voltage of said secondary winding and at least said second primary part will provide voltage to operate the said gaseous discharge devices, said apparatus having means providing for the ignition of the other of said gaseous discharge devices in a sequence with said one gaseous discharge device and without utilizing the open circuit voltage of said secondary winding.

23. Apparatus as claimed in claim 22 in which the core includes a central winding leg and parallel side parts, the ends being connected by yokes, and all of the windings being mounted on the center winding leg with a substantial distance between said secondary winding and first primary part providing said relatively loose coupling.

24. Apparatus as claimed in claim 22 in which the core includes a central winding leg and parallel side parts, the ends being connected by yokes, and all of the windings being mounted on the center winding leg and confined between the side parts, there being a substantial volume of non-magnetic material between said first primary part and secondary winding spacing the same apart and providing said relatively loose coupling.

25. Apparatus as claimed in claim 23 in which the core has a transverse bridged slot therein in the vicinity of that end of the secondary winding facing said first primary part.

26. Apparatus as claimed in claim 18 in which the core has a transverse bridged slot therein in the vicinity of that end of the secondary winding coil which is closer to said first primary part coil.

27. Apparatus as claimed in claim 26 in which the core has a plurality of spaced transverse bridged slots therein beneath the secondary winding coil.

28. Apparatus as claimed in claim 26 in which the core has a plurality of spaced transverse bridged slots therein beneath the secondary winding coil, and the length of the slots decreasing along the length of the coil with the largest slot in the vicinity of that end of the secondary winding coil closest to said first primary part coil.

29. In apparatus of the character described and in which there is an elongate iron core transformer having a central winding leg having a plurality of windings mounted thereon, the windings being in the physical form of coils of generally rectangular configuration on tubular forms coaxially mounted upon the winding leg along the length of the core, means for providing a loose coupling between a pair of said windings which comprises, a tubular form having one of said windings disposed thereon and occupying only a portion of the axial length thereof whereby to provide an unoccupied portion of predetermined length thereon, and the tubular form being abutted against the coil of the second winding of said pair with the unoccupied portion between windings.

References Cited in the file of this patent
UNITED STATES PATENTS

| | | |
|---|---|---|
| 2,196,809 | Hoadley | Apr. 9, 1940 |
| 2,486,307 | Mauerer | Oct. 25, 1949 |
| 2,510,209 | Bridges | June 6, 1950 |
| 2,598,252 | Gossick | May 27, 1952 |